Dec. 11, 1923.
R. SPRINGBORN
VALVE OPERATING MECHANISM
Filed April 14, 1921
1,477,154
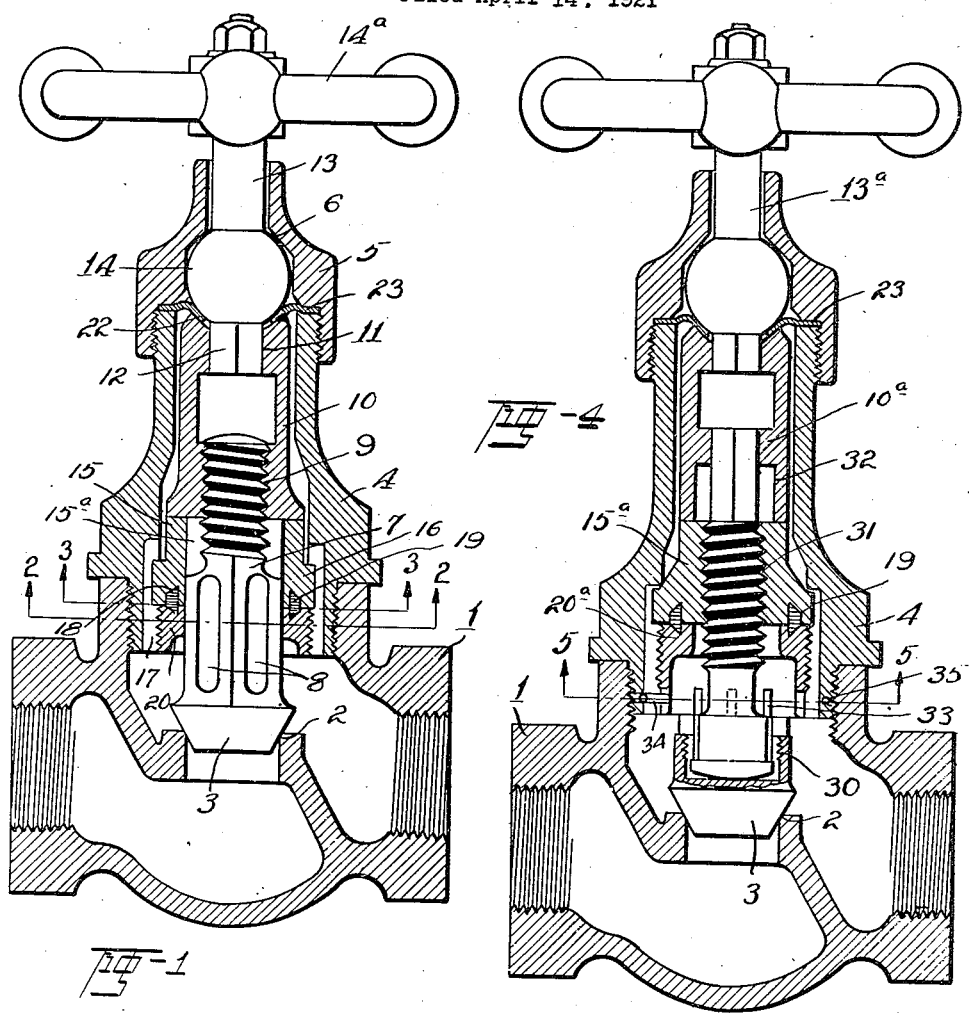
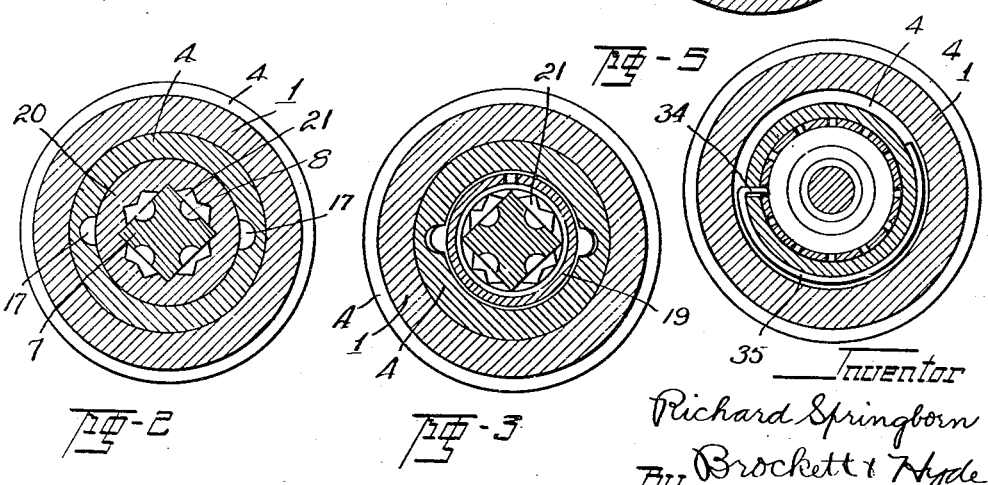

Patented Dec. 11, 1923.

1,477,154

UNITED STATES PATENT OFFICE.

RICHARD SPRINGBORN, OF CLEVELAND, OHIO.

VALVE-OPERATING MECHANISM.

Application filed April 14, 1921. Serial No. 461,189.

*To all whom it may concern:*

Be it known that I, RICHARD SPRING-BORN, a citizen of the United States, residing at Cleveland, in the county of Cuyahoga and State of Ohio, have invented certain new and useful Improvements in Valve-Operating Mechanism, of which the following is a specification.

This invention relates to valve operating mechanism, and more particularly to what are known as packless valves.

The object of the invention is to provide a new and improved valve of this construction which is provided with improved sealing means to prevent not only loss or escape of fluid pressure to the outside of the valve casing but also to prevent inward flow of air under suction or vacuum conditions in the line.

A further object of the invention is to provide a double seal for valves of this kind to more completely prevent leakage past the valve operating mechanism.

Further objects of the invention are in part obvious and in part will appear more in detail hereinafter.

The invention comprises the construction and arrangement of parts hereinafter described and claimed.

In the drawings, Fig. 1 represents a sectional elevation through one form of valve embodying the invention; Fig. 2 is a sectional plan view on the line 2—2, Fig. 1; Fig. 3 is a sectional view on the line 3—3, Fig. 1; Fig. 4 is a view corresponding to Fig. 1 and illustrating another arrangement; and Fig. 5 is a sectional view on the line 5—5, Fig. 4.

Referring to Fig. 1, the valve comprises a body or casing 1 in which is a valve seat 2 co-operating with a movable valve member 3 which controls the flow of fluid through the valve body. 4 represents the bonnet which is provided with suitable threaded connection to the body and at its upper end is provided with a cap 5 having a seat 6 therein. The valve stem 7 has its lower portion of non-circular cross section, and is shown as square, as illustrated in Fig. 2, the outer surfaces thereof being provided with vertical channels 8 for drainage purposes. At its upper end the valve stem has a threaded portion 9 screwing into a driving member or nut 10, the upper end of which has a non-circular, say square, opening 11 to receive a similarly shaped driving end portion 12 of the valve operating member 13 which has a spherical or ball portion 14 within the valve cap and engaging the seat 6 thereof and an end portion extending to the outside of the bonnet where it is provided with the usual driving wheel 14$^a$. Below the driving member or nut 10 is located a seat member 15 having a square central opening 15$^a$ and slidable longitudinally in the bonnet but held from rotation therein in any suitable manner, such as by being provided with wings 16 sliding in longitudinal grooves or channels 17 in the bonnet. This seat member has a tapered or conical seat 18 to receive a split annulus or spring member 19 of the form and arrangement shown in my prior Patent No. 1,278,246, for Cushioning device, patented Sept. 10, 1918. Below the split annulus 19 is a nut 20 having an opening therein with a plurality of angles or recesses 21 so that it can be comparatively finely adjusted to regulate the pressure of the spring and nevertheless receive the square valve stem. The upper end of the driving member 10 has a tapered or partially spherical seat 22 below the lower end of the ball 14, but interposed between said seat and ball is a flexible metal diaphragm 23 of washer form, the periphery of which is held between the bonnet and cap and which may be made of any slightly flexible material, preferably metal, such as brass or copper.

To assemble the parts it should be first assumed that the bonnet is detached from the body with the valve stem detached therefrom. The operating member 13, driving member 10, sealing member 23, seat member 15 and nut 20, and annulus 19 are assembled in the bonnet, the nut 20 being screwed up to produce the requisite spring pressure, said pressure being exerted upwardly and tightly holding the seat 22 against the washer 23, said washer against the ball 14 and the ball against the seat 6. The valve stem is then inserted and the operating handle turned to thread it into place, whereupon the bonnet is attached to the body.

In operation, rotation of the operating handle 14$^a$ moves the valve against its seat. At all times the spring 19 produces a tight seal at both the upper and lower ends of the ball member 14. Any suction effect in the valve body which might pull down member 15 and 10 and move the ball away from the seat 6 will still maintain a seal at the washer 23 and avoid leakage.

The invention may, of course, be applied to any valve regardless of the form of the operating mechanism therefor. For example, in Fig. 1 the threads on the valve stem and member 10 are left hand threads. In Fig. 4 is shown another arrangement where right hand threads are used. In this case the valve member 3 has suitable swiveled connection to the valve stem as indicated generally at 30. In this case the valve stem has threaded engagement at 31 with threads in the seat member 15$^a$, the upper end of said stem having a square portion 32 in driving relation with the driving member 10$^a$ which in turn is driven by the operating member 13$^a$ as in the other form. The adjusting nut 20$^a$ for the spring annulus 19 is provided with a central round opening through which the valve stem passes and is held against rotation in the bonnet by being provided with a series of notches or recesses 33 to receive the inwardly projecting end 34 of a wire annulus 35 lying in a groove in the outside of the valve bonnet, as shown in Fig. 5. So far as the sealing washer or diaphragm 23 is concerned it is the same in construction and operation as in the preceding form.

What I claim is:

1. In combination, a valve bonnet, an adjustable valve member therein, a valve driving member having a seat portion, an operating member extending from the inside of said bonnet to the outside thereof and adapted to actuate said driving member, said operating member being provided within said valve bonnet with a seat portion on the side toward and co-operating with the seat portion of said driving member and having another seat portion engaging a seat on said bonnet, and yielding means for maintaining said seat portions seated.

2. In combination, a valve bonnet, an adjustable valve member therein, a valve driving member, an operating member extending from the inside of said bonnet to the outside thereof and adapted to actuate said driving member, a flexible washer seating on said driving member and having its periphery sealed in said bonnet, said operating member being provided within said valve bonnet with a portion engaging said flexible washer and said bonnet, and yielding means for maintaining engagement between said operating member and said washer and bonnet.

3. In combination, a valve bonnet, an adjustable valve member therein, a valve driving member, an operating member extending from the inside of said bonnet to the outside thereof and adapted to actuate said driving member, a flexible metal washer seating on said driving member and having its periphery sealed in said valve bonnet, said operating member being provided within said bonnet with an enlarged spherical portion engaging said bonnet and said flexible washer, and yielding means for maintaining engagement between the spherical portion of said operating member and said washer and bonnet.

4. In combination, a valve bonnet, an adjustable valve member therein, an operating member having one portion seating against the bonnet and another portion extending to the outside thereof, a valve driving member actuated by said operating member and having a seating portion for co-operating with said operating member, and yielding means effective upon said driving member tending to move it toward said operating member.

5. In combination, a valve bonnet, an adjustable valve member therein, operating means therefor having a spherical portion, a flexible washer having its periphery clamped in the bonnet, and yielding means effective upon said washer for holding the same against said spherical portion to seal the valve against the escape of fluid pressure.

6. In combination, a valve bonnet, an adjustable valve member therein, an operating member having a sealing seat, a flexible metal washer having its periphery clamped in the bonnet and adapted to be held against said seat, and a valve driving member actuated by said operating member and yieldingly engaging said washer to hold the same to its seat.

In testimony whereof I hereby affix my signature.

RICHARD SPRINGBORN.